(12) United States Patent
Hernandez Esteban

(10) Patent No.: US 8,553,997 B1
(45) Date of Patent: Oct. 8, 2013

(54) DEPTHMAP COMPRESSION

(75) Inventor: Carlos Hernandez Esteban, Kirkland, WA (US)

(73) Assignee: Google Inc., Mountain View, CA (US)

( * ) Notice: Subject to any disclaimer, the term of this patent is extended or adjusted under 35 U.S.C. 154(b) by 57 days.

(21) Appl. No.: 13/303,085

(22) Filed: Nov. 22, 2011

Related U.S. Application Data

(60) Provisional application No. 61/524,301, filed on Aug. 16, 2011.

(51) Int. Cl.
*H04N 7/50* (2006.01)

(52) U.S. Cl.
USPC ............................ 382/232; 382/154; 382/233

(58) Field of Classification Search
USPC ......... 382/128, 131, 132, 232, 154, 164, 103, 382/236, 233; 345/419; 375/240.1; 348/42, 348/43, 169; 386/239, 330, 326, 328
See application file for complete search history.

(56) References Cited

U.S. PATENT DOCUMENTS

| | | | | |
|---|---|---|---|---|
| 7,324,687 B2 * | 1/2008 | Zitnick et al. | ................. | 382/154 |
| 7,379,583 B2 * | 5/2008 | Zitnick et al. | ................. | 382/154 |
| 8,044,994 B2 * | 10/2011 | Vetro et al. | ...................... | 348/42 |
| 8,073,196 B2 * | 12/2011 | Yuan et al. | .................... | 382/103 |
| 8,126,226 B2 * | 2/2012 | Bernard et al. | ............... | 382/128 |
| 8,384,763 B2 * | 2/2013 | Tam et al. | ....................... | 348/43 |

\* cited by examiner

*Primary Examiner* — Anh Do
(74) *Attorney, Agent, or Firm* — McDermott Will & Emery LLP

(57) ABSTRACT

Systems and methods for compressing a depthmap are provided. In some aspects, a system includes an encoding module configured to determine a minimum value and a maximum value of a depthmap. The encoding module is further configured to normalize the depthmap based on the minimum value, the maximum value, and an encoding model. The normalized depthmap includes a scalar value for each pixel of the depthmap. The system also includes a compression module configured to compress the normalized depthmap.

28 Claims, 7 Drawing Sheets

DEPTHMAP COMPRESSION

CROSS-REFERENCES TO RELATED APPLICATIONS

The present application claims the benefit of U.S. Provisional Patent Application Ser. No. 61/524,301, entitled "Systems and Methods for Compressing a Depthmap," filed on Aug. 16, 2011, which is hereby incorporated by reference in its entirety for all purposes.

FIELD

The subject technology generally relates to depthmaps and, in particular, relates to systems and methods for compressing depthmaps.

BACKGROUND

Depthmaps present challenges for applications in a client-server environment. Depthmaps tend to be relatively large and therefore consume valuable bandwidth when being served across a network. Depthmaps may also require the client to have a proprietary decoder to retrieve depthmap data from the depthmaps after receipt.

SUMMARY

According to various aspects of the subject technology, a system for compressing a depthmap is provided. The system comprises an encoding module configured to determine a minimum value and a maximum value of a depthmap. The encoding module is further configured to normalize the depthmap based on the minimum value, the maximum value, and an encoding model. The normalized depthmap comprises a scalar value for each pixel of the depthmap. The system also comprises a compression module configured to compress the normalized depthmap.

According to various aspects of the subject technology, a computer-implemented method for compressing a depthmap is provided. The method comprises determining a minimum value and a maximum value of a depthmap. The method also comprises normalizing the depthmap based on the minimum value, the maximum value, and an encoding model. The normalized depthmap comprises a scalar value for each pixel of the depthmap. The method also comprises compressing the normalized depthmap.

According to various aspects of the subject technology, a system for compressing a depthmap is provided. The system comprises an encoding module configured to determine a minimum value and a maximum value of a depthmap. The encoding module is further configured to normalize the depthmap based on the minimum value, the maximum value, and an encoding model. The normalized depthmap comprises a scalar value for each pixel of the depthmap. The encoding model comprises at least one of a linear model and a nonlinear model. The system also comprises a compression module configured to compress the normalized depthmap using Joint Photographic Experts Group (JPEG) compression. The system also comprises a transmission module configured to combine metadata with the compressed normalized depthmap into a transmission file. The metadata comprises at least one of the minimum value, the maximum value, and a type of the encoding model.

According to various aspects of the subject technology, a system for compressing a depthmap is provided. The system comprises an encoding module configured to group a plurality of pixels of a depthmap. Each grouped pixel of the depthmap comprises a depth value and is associated with an optic ray aligned with a camera capturing the depthmap. Each of the plurality of depth values is within a predetermined offset from one another. The encoding module is further configured to generate a primitive based on the grouped plurality of pixels. The primitive comprises an identification value. Each of the plurality of optic rays intersects a corresponding portion of the primitive. The encoding module is further configured to transform the depthmap based on the primitive. Each grouped pixel of the transformed depthmap comprises the identification value. The system also comprises a compression module configured to compress the transformed depthmap using a lossless image compression scheme.

According to various aspects of the subject technology, a computer-implemented method for compressing a depthmap is provided. The method comprises grouping a plurality of pixels of a depthmap. Each grouped pixel of the depthmap comprises a depth value and is associated with an optic ray aligned with a camera capturing the depthmap. Each of the plurality of depth values is within a predetermined offset from one another. The method also comprises generating a primitive based on the grouped plurality of pixels. The primitive comprises an identification value. Each of the plurality of optic rays intersects a corresponding portion of the primitive. The method also comprises transforming the depthmap based on the primitive. Each grouped pixel of the transformed depthmap comprises the identification value. The method also comprises compressing the transformed depthmap using a lossless image compression scheme.

According to various aspects of the subject technology, a machine-readable medium encoded with executable instructions for compressing a depthmap is provided. The instructions comprise code for grouping a plurality of pixels of a depthmap. Each grouped pixel of the depthmap comprises a depth value and is associated with an optic ray aligned with a camera capturing the depthmap. Each of the plurality of depth values is within a predetermined offset from one another. The instructions also comprise code for generating a primitive based on the grouped plurality of pixels. The primitive comprises an identification value. Each of the plurality of optic rays intersects a corresponding portion of the primitive. The instructions also comprise code for transforming the depthmap based on the primitive. Each grouped pixel of the transformed depthmap comprises the identification value. The instructions also comprise code for compressing the transformed depthmap using a lossless image compression scheme. The instructions also comprise code for combining metadata with the compressed transformed depthmap into a transmission file. The metadata comprises at least one of the identification value, identification information of each of the grouped plurality of pixels, and one or more parameters defining the primitive.

According to various aspects of the subject technology, a computer-implemented method for decoding a compressed depthmap is provided. The method comprises receiving a compressed version of a depthmap and decompressing the compressed version of the depthmap to generate a decompressed version of the depthmap. The decompressed version of the depthmap is normalized based on a minimum value of an original version of the depthmap, a maximum value of the original version of the depthmap, and an encoding model. The normalized depthmap comprises a scalar value for each pixel of the original version of the depthmap. The method also comprises decoding the normalized depthmap to generate the original version of the depthmap.

According to various aspects of the subject technology, a computer-implemented method for decoding a compressed depthmap is provided. The method comprises receiving a compressed version of a depthmap and decompressing the compressed version of the depthmap using a lossless image decompression scheme to generate a decompressed version of the depthmap. The decompressed version of the depthmap is transformed based on a primitive comprising an identification value. The primitive is generated based on a grouped plurality of pixels of an original version of the depthmap. Each grouped pixel of the original version of the depthmap comprises a depth value and is associated with an optic ray aligned with a camera capturing the original version of the depthmap. Each of the plurality of depth values is within a predetermined offset from one another. Each of the plurality of optic rays intersects a corresponding portion of the primitive. Each grouped pixel of the transformed depthmap comprises the identification value. The method also comprises decoding the transformed depthmap to generate the original version of the depthmap.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

While a software-based map provides two-dimensional position information of one or more structures in an area, a depthmap may be used to supplement the software-based map by providing depth information of the one or more structures. The software-based map is typically delivered over a network from a server to a client device (e.g., a laptop computer, a desktop computer, a netbook, a mobile phone, a tablet, etc.) so that the software-based map can be displayed on the client device (e.g., using a browser or some other suitable user interface). However, a depthmap is typically a relatively large file, and therefore may consume valuable bandwidth when being served across the network.

Figure 1:
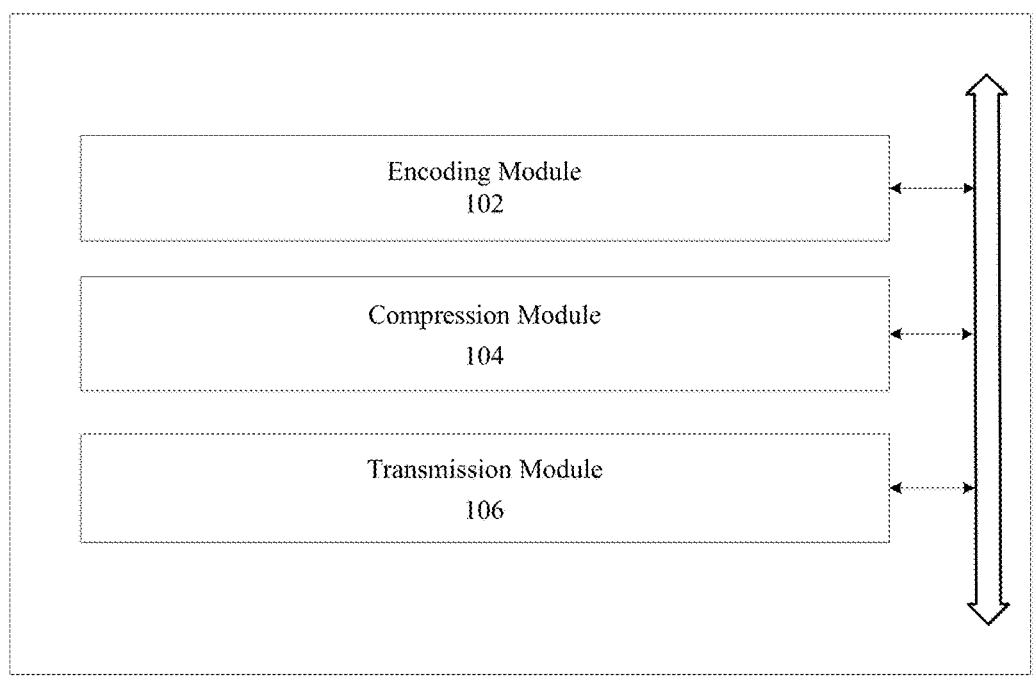
FIG. 1 illustrates an example of a system for compressing a depthmap, in accordance with various aspects of the subject technology.

Aspects of the subject technology solve the foregoing problem by providing a way to compress a depthmap such that the compressed depthmap can be served over a network to a client device and be quickly decompressed/decoded by the client device. FIG. 1 illustrates an example of system 100 for compressing a depthmap, in accordance with various aspects of the subject technology. System 100 comprises encoding module 102, compression module 104, and transmission module 106. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 2:
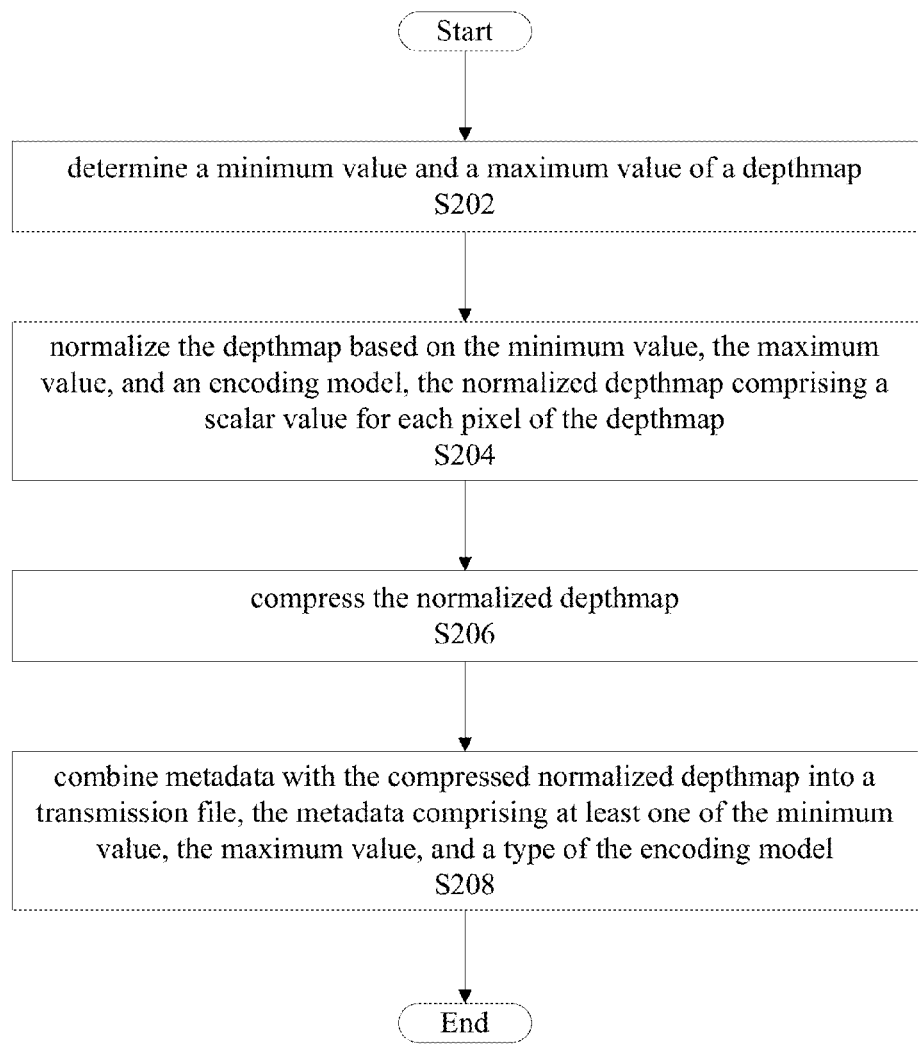
FIG. 2 illustrates an example of a method for compressing a depthmap, in accordance with various aspects of the subject technology.
Figure 3:
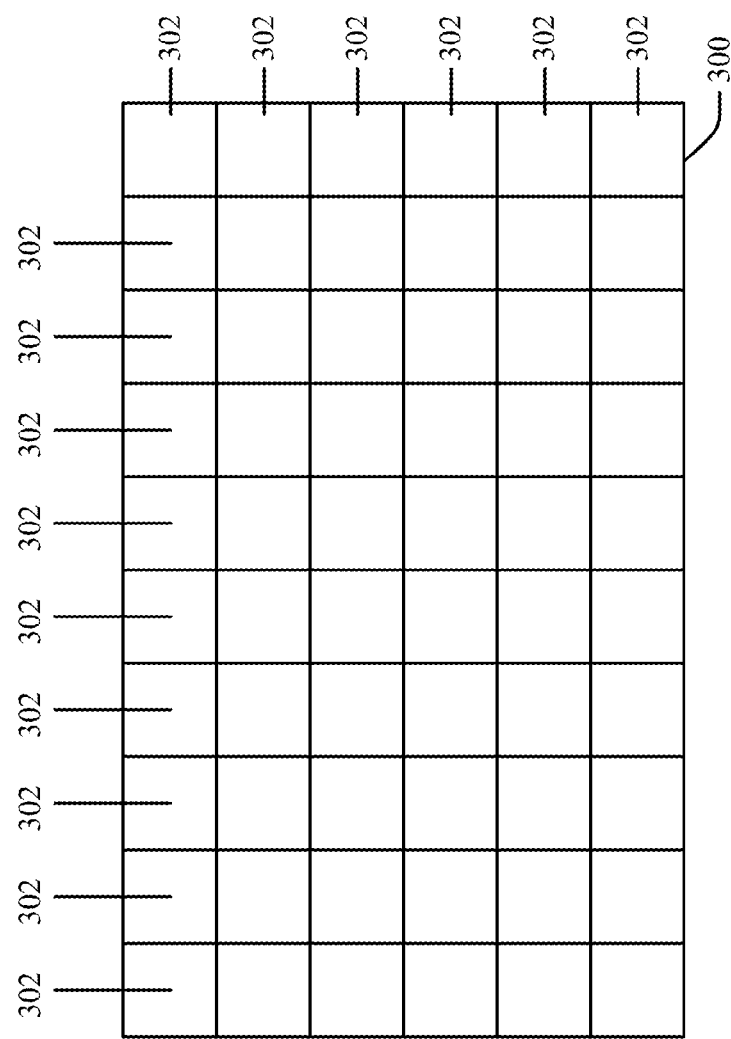
FIG. 3 illustrates an example of a depthmap, in accordance with various aspects of the subject technology.

FIG. 2 illustrates an example of method 200 for compressing a depthmap, in accordance with various aspects of the subject technology. FIG. 3 illustrates an example of such a depthmap. Depthmap 300 in FIG. 3 comprises one or more pixels 302, as depicted by each square within depthmap 300. A depth value may be stored in each of the one or more pixels 302. Each depth value may be a representation of a distance between a particular point (e.g., a three-dimensional point) associated with a corresponding pixel 302 and a camera that captured depthmap 300.

Aspects of the subject technology utilize a normalized depthmap format that may be suitable for compression and be quickly decompressed/decoded by a client device. Under the normalized depthmap format, a minimum depth (e.g., a near value in relation to the camera) and a maximum depth (e.g., a far value in relation to the camera) for the depthmap may be defined. A scalar value may be generated for each pixel in the depthmap based on an encoding model. The scalar value may then be used to interpolate the depth between the minimum and maximum depths for a respective pixel. In this regard, the normalized depthmap format may also be referred to as a range depthmap format. The normalized depthmap may then be compressed using a conventional compression scheme so that the client device can quickly decompress/decode the compressed normalized depthmap. An example of such a conventional compression scheme is Joint Photographic Experts Group (JPEG) compression, which is a lossy compression scheme that involves quantization errors.

According to step S202 in FIG. 2, encoding module 102 may determine a minimum value and a maximum value of the depthmap. For example, the minimum value of depthmap 300 in FIG. 3 may be the depth value stored in the one or more pixels 302 that has a value nearest the camera (e.g., the lowest value from among the depth values associated with the one or more pixels 302). The maximum value of depthmap 300, for example, may be the depth value stored in the one or more pixels 302 that has a value farthest away from the camera (e.g., the highest value from among the depth values associated with the one or more pixels 302).

According to step S204, encoding module 102 may then normalize the depthmap based on the minimum value, the maximum value, and the encoding model. The normalized depthmap may comprise the scalar value for each pixel of the depthmap. As discussed above, the scalar value is used to interpolate the depth between the minimum value and the maximum value for a respective pixel. The scalar value may be computed differently depending on the encoding model that is used to generate the normalized depthmap. For example, the encoding model may be at least one of a linear model and a nonlinear model.

Under the linear model, the scalar value for each pixel of the depthmap is given by $$\frac{d-\min}{\max-\min}, \quad (1)$$

where d is a depth value of a corresponding pixel of the depthmap, min is the minimum value, and max is the maximum value.

Under the nonlinear model, the scalar value for each pixel of the depthmap is given by $$\frac{d\max - \max\min}{d(\max-\min)} = \frac{\max}{\max-\min} - \left(\frac{\max\min}{\max-\min}\right)\frac{1}{d}, \quad (2)$$

where d is a depth value of a corresponding pixel of the depthmap, min is the minimum value, and max is the maximum value.

The encoding model may be selected based on the type of image that the depthmap was generated from. For example, the linear model may be used for orthographic images. That is, the linear model may be used if the depthmap is generated from an orthographic image (e.g., captured by an orthographic camera). The orthographic image provides an orthographic view of a scene in which orthographic rays are parallel to one another. Under the linear model, when the normalized depthmap is compressed (e.g., using JPEG compression), any quantization error may be spread evenly throughout the full depth range between the minimum value and the maximum value. This is the desired behavior for an orthographic camera where, due to the projection model being used, the final screen coordinates of a particular three-dimensional (3D) point do not depend on the 3D point's depth along a camera viewing direction.

In contrast to the linear model, the nonlinear model may be used for perspective images (e.g., captured by perspective cameras). For perspective cameras however, the linear model may not be appropriate, since the final screen coordinates of a particular 3D point do depend on the 3D point's depth along the camera viewing direction (e.g., perspective divide). As a result, it is desirable to have less quantization error for lower depth values in order to have a substantially constant screen coordinate error throughout the full depth range between the minimum value and the maximum value. That is, depth can be more efficiently encoded by allocating more bits to near depth values (e.g., values closer to the minimum value), and less bits to far away depth values (e.g., values closer to the maximum value). This allocation takes into account the fact that the 3D point's coordinates may eventually be divided by its depth, so far away depth values do not need to be as precise as near depth values. Thus, the nonlinear model (e.g., a perspective model) may be used for perspective images. For example, the nonlinear model may be used if the depthmap is generated from a perspective image. The perspective image provides a perspective view of a scene in which perspective rays converge at a single source (e.g., at the perspective camera).

Figure 4C:
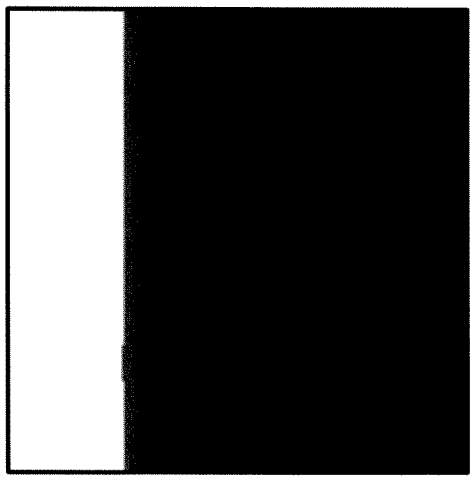
FIGS. 4A, 4B, and 4C illustrate a comparison between a linear encoding model and a nonlinear encoding model when applied to a perspective image, in accordance with various aspects of the subject technology.
Figure 4B:
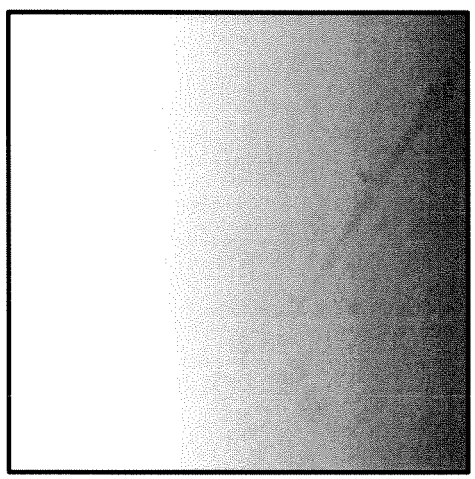
Figure 4A:

FIGS. 4A, 4B, and 4C illustrate a comparison between the linear model and the nonlinear model when applied to a perspective image, in accordance with various aspects of the subject technology. FIG. 4A illustrates an example of a perspective image. FIGS. 4B and 4C illustrate examples of respective depthmaps generated from the perspective image shown in FIG. 4A. The depthmap in FIG. 4B was encoded using the nonlinear model, while the depthmap in FIG. 4C was encoded using the linear model. As shown in these figures, the depthmap using the nonlinear model (e.g., FIG. 4B) is more accurate in conveying depth information of the perspective image than is the depthmap using the linear model (e.g., FIG. 4C). Thus, it is more appropriate to use the nonlinear model for perspective images.

According to certain aspects, the scalar value for each pixel of the depthmap generated from either the linear model or the nonlinear model (e.g., from equations (1) or (2)) may be greater than or equal to zero, in addition to being less than or equal to 1. However, other suitable values for the scalar value may be used provided that the scalar values of the depthmap are normalized with respect to the depth values.

Once the depthmap has been normalized (e.g., the scalar values for each pixel of the depthmap has been computed), the normalized depthmap can be compressed. According to step S206 in FIG. 2, compression module 104 may compress the normalized depthmap. As discussed above, a conventional compression scheme may be used so that the client device can quickly decompress/decode the compressed normalized depthmap without having to rely on a proprietary decoder. For example, compression module 104 may compress the normalized depthmap using JPEG compression (e.g., JPEG 90-95 grayscale compression). Client devices commonly include decoders capable of decoding JPEG files to retrieve compressed data. As JPEG compression utilizes an integer index between 0 and 255, compression module 104 may multiply the scalar value for each pixel of the depthmap by 255 to generate a compression value. The compression values may then be rounded to the nearest integer to satisfy the requirements of JPEG compression. Although JPEG compression has been described, other compression schemes supported by the client device (e.g., by a browser of the client device) may be used to compress the normalized depthmap, such as a portable network graphics (PNG) compression scheme. According to certain aspects, a size of the compressed normalized depthmap is less than ¹⁄₁₀th of a size of the original depthmap. However, the normalized depthmap may be compressed to other sizes depending on the size of the normalized depthmap, bandwidth limitations, available compression schemes supported by the client device, the desired size of the compressed normalized depthmap, etc.

Once the normalized depthmap has been compressed, the compressed normalized depthmap may then be transmitted to the client device. However, in order for the client device to decode the compressed normalized depthmap, other information may need to be transmitted. This information may include the minimum value, the maximum value, a type of the encoding model that was used to encode the depthmap (e.g., either the linear encoding model or the nonlinear model), and other suitable information that can be used by the client device to decode the compressed normalized depthmap. Transmission module 106 may package this information as metadata along with the compressed normalized depthmap into a single file so that the file may be transmitted to the client device. According to step S208, transmission module 106 may combine the metadata with the compressed normalized depthmap into a transmission file. This metadata may comprise at least one of the minimum value, the maximum value, a type of the encoding model, and a type of compression scheme associated with the compressed normalized depthmap. The transmission file may then be transmitted over the network to the client device. According to certain aspects, the transmission file may be a JavaScript Object Notation (JSON) file (e.g., a gziped base64 JSON file). In this manner, a JavaScript decoder at the client device can readily and quickly retrieve depthmap data from the transmission file. For example, with knowledge of the type of encoding model and/or the type of compression scheme from the metadata, the client device may access the depthmap data (e.g., view and/or use the contents of the depthmap data) from the compressed normalized depthmap. In some aspects, using the knowledge of the type of encoding model and/or the type of compression scheme from the metadata, the client device may access the depthmap data without explicitly decompressing the compressed normalized depthmap.

Aspects of the subject technology provide another way to compress a depthmap using one or more primitives. For example, the depthmap may be encoded in a format such that each pixel of the depthmap defines an index to a primitive, such as a three-dimensional (3D) plane. Encoding the indexes instead of the actual depth values of the depthmap may allow for greater compression of the depthmap. The primitive may then be used to define an operation to obtain the depth values associated with the pixels of the depthmap. For example, each pixel may be associated with an optic ray that intersects with a corresponding portion of the primitive. With this intersection information as well as parameters of the primitive, the depth values of the depthmap may be obtained.

Figure 5:
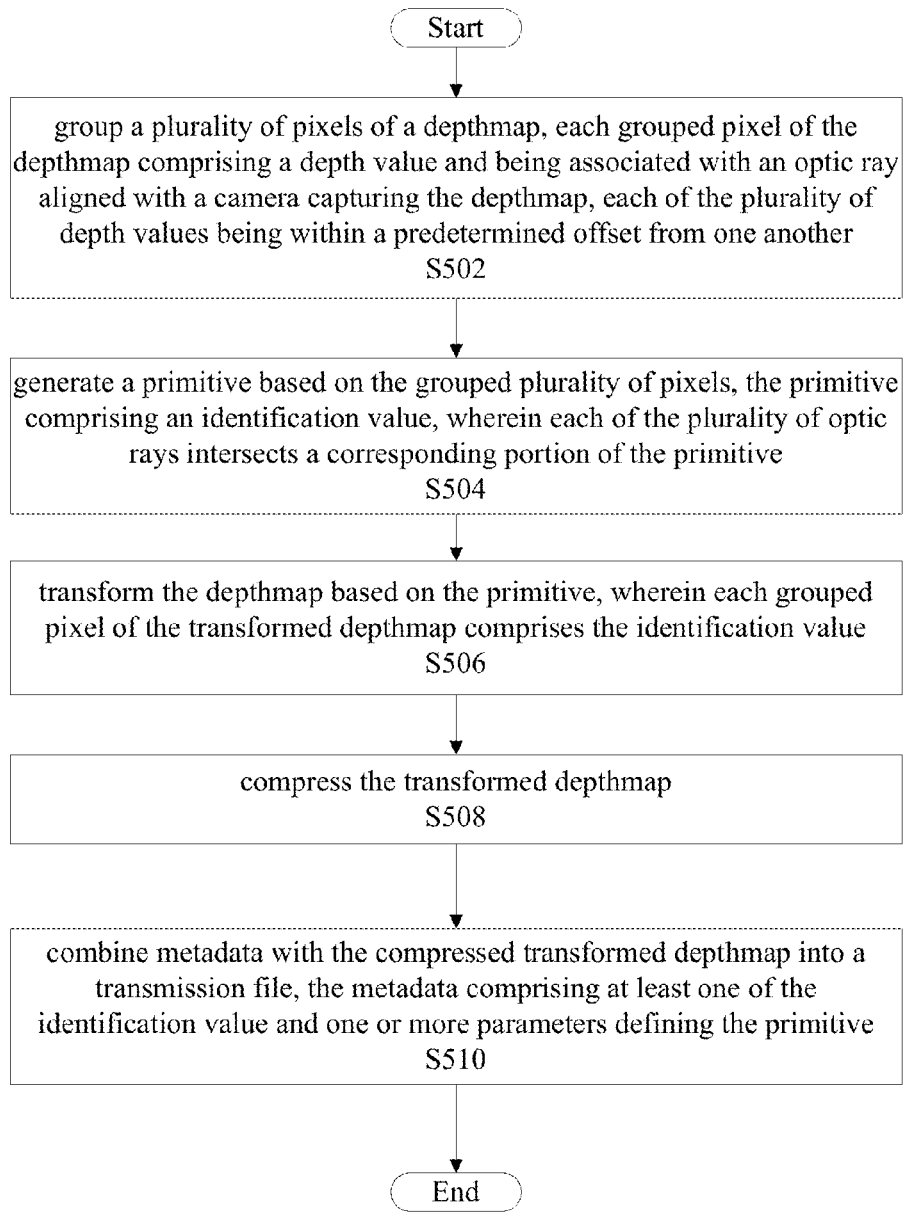
FIG. 5 illustrates an example of a method for compressing a depthmap using a primitive, in accordance with various aspects of the subject technology.

FIG. 5 illustrates an example of method 500 for compressing a depthmap using a primitive, in accordance with various aspects of the subject technology. According to step S502, encoding module 102 may group a plurality of pixels of a depthmap, such as depthmap 300 in FIG. 3. As discussed above, a depth value may be stored in each of the one or more pixels 302. Each depth value may be a representation of a distance between a particular point (e.g., a three-dimensional point) associated with a corresponding pixel 302 and a camera that captured depthmap 300.

Figure 6:
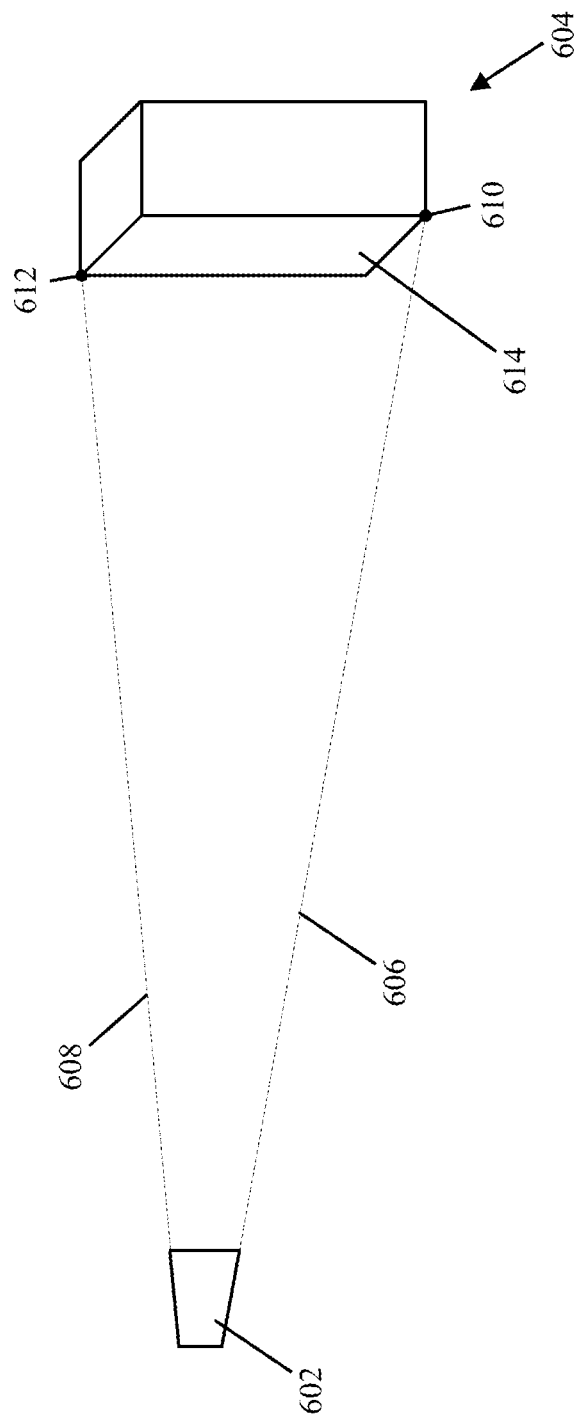
FIG. 6 illustrates an example of a camera being used to capture an image of a building to generate a depthmap, in accordance with various aspects of the subject technology.

FIG. 6 illustrates an example of camera 602 being used to capture an image of building 604 to generate a depthmap, in accordance with various aspects of the subject technology. As shown, the distance between point 610 and camera 602 along optic ray 606 may be stored as a depth value in a pixel associated with point 610. Similarly, the distance between point 612 and camera 602 along optic ray 608 may be stored as a depth value in a pixel associated with point 612. The points on side 614 of building 604 (including points 610 and 612) may be roughly the same distance away from camera 602 as one another. As a result, the pixels of the depthmap associated with the points on side 614 may be grouped together. These grouped pixels may have depth values that are roughly the same as one another. For example, each of these depth values may be within a predetermined offset from one another. In some aspects, the predetermined offset may be less than ten percent of a maximum one of the depth values associated with side 614. However, the predetermined offset may be greater or smaller depending on the range of the depth values, the desired accuracy of the depthmap, the desired compression of the depthmap, etc. Furthermore, each of the grouped pixels displaying side 614 may be associated with a respective optic ray that is aligned with camera 602 (e.g., optic rays 608 and 606).

Returning to FIGS. 1 and 5, according to step S504, encoding module 102 may generate a primitive based on the grouped plurality of pixels from step S502. For example, the primitive may be a plane that matches side 614 of building 604 in FIG. 6. The primitive may be shaped such that each of the plurality of optic rays associated with the pixels of side 614 (e.g., optic rays 606 and 608) may intersect a corresponding portion of the primitive. Although the primitive may be a plane, the primitive may also comprise other geometric shapes (e.g., an ellipsoid) that can be parameterized. For example, the primitive may be a geometric shape that can be described by a set of equations. The set of equations, for example, may be used later at the client device to obtain the depth values associated with side 614 of building 604.

The primitive may comprise an identification value for identifying the primitive. For example, the primitive may comprise an identification value of "1," which may allow each pixel of the depthmap to index to this particular primitive by storing the identification value of "1." In some aspects, if more than one primitive is desired, each primitive may have a different identification value from one another (e.g., "2," "3," "4," and so on).

According to step S506, encoding module 102 may transform the depthmap based on the primitive. Each grouped pixel of the transformed depthmap may comprise the identification value. For example, as discussed above, if the identification value for the primitive is "1," then each pixel associated with side 614 may store a value of "1" in reference to the primitive instead of the actual depth value. As a result, the transformed depthmap may be reduced in size compared to the original depthmap.

According to step S508, compression module 104 may compress the transformed depthmap. The transformed depthmap may be compressed using a lossless image compression scheme such as a portable network graphics (PNG) compression scheme. This type of compression can be quickly decompressed/decoded by the client device without having to rely on a proprietary decoder. According to certain aspects, a size of the compressed transformed depthmap is less than 1/10th of a size of the original depthmap. However, the transformed depthmap may be compressed to other sizes depending on the size of the transformed depthmap, bandwidth limitations, available compression schemes supported by the client device, the desired size of the compressed transformed depthmap, etc.

Once the transformed depthmap has been compressed, the compressed transformed depthmap may then be transmitted to the client device. However, in order for the client device to decode the compressed transformed depthmap, other information may need to be transmitted. This information may include the identification value, one or more parameters defining the primitive (e.g., a set of equations defining the primitive), and other suitable information that can be used by the client device to decode the compressed transformed depthmap. Transmission module 106 may package this information as metadata along with the compressed transformed depthmap into a single file so that the file may be transmitted to the client device. According to step S510, transmission module 106 may combine the metadata with the compressed transformed depthmap into a transmission file. This metadata may comprise at least one of the identification value, one or more parameters defining the primitive, and a type of compression scheme associated with the compressed transformed depthmap. If more than one primitive is used, the metadata may comprise a list of the plurality of primitives along with their respective identification values.

According the certain aspects, the transmission file may then be transmitted over the network to the client device. According to certain aspects, the transmission file may be a JavaScript Object Notation (JSON) file (e.g., a gziped base64 JSON file). In this manner, a JavaScript decoder at the client device can readily and quickly retrieve depthmap data from the transmission file. The metadata, for example, may allow the client device to decode the compressed transformed depthmap into the original depthmap. For example, using the primitive parameter information as well as the intersection of the primitive with each optic ray of the grouped pixels of the depthmap, the depth values can be computed along each of the optic rays. In another example, with knowledge of the identification value, one or more parameters defining the primitive, and/or a type of compression scheme associated with the compressed transformed depthmap from the metadata, the client device may access the depthmap data (e.g., view and/or use the contents of the depthmap data) from the compressed transformed depthmap. In some aspects, using the knowledge of the identification value, one or more parameters defining the primitive, and/or a type of compression scheme associated with the compressed transformed depthmap from the metadata, the client device may access the depthmap data without explicitly decompressing the compressed transformed depthmap.

Figure 7:
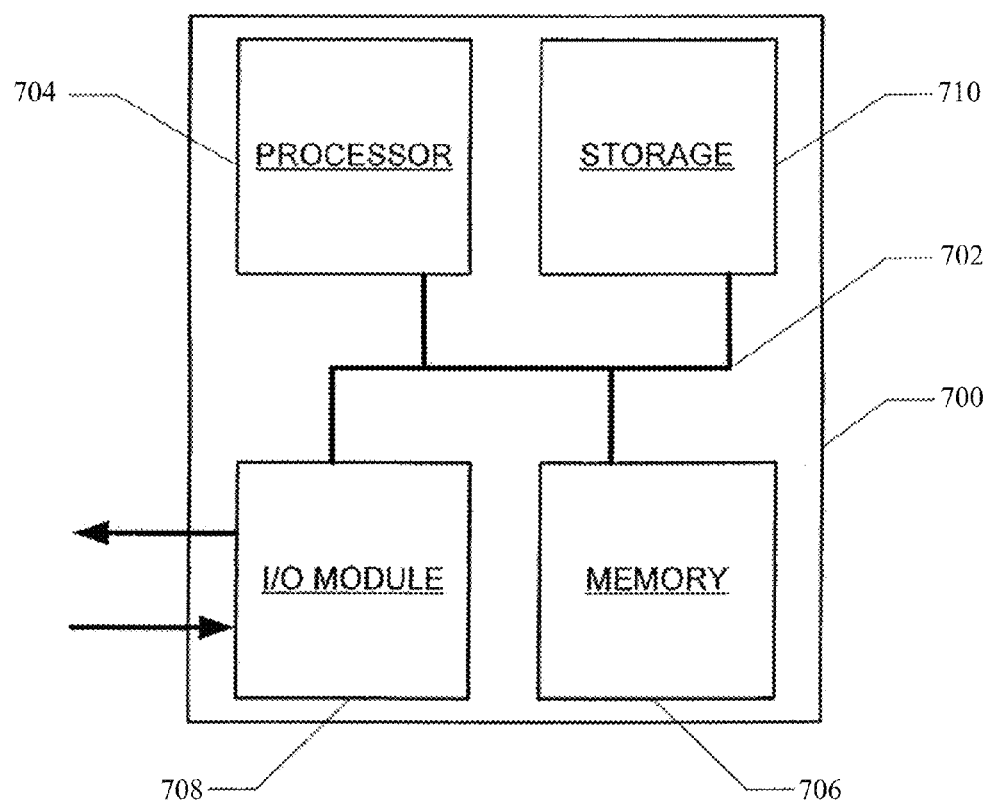
FIG. 7 is a block diagram illustrating components of a controller, in accordance with various aspects of the subject technology.

FIG. 7 is a block diagram illustrating components of controller 700, in accordance with various aspects of the subject technology. Controller 700 comprises processor module 704, storage module 710, input/output (I/O) module 708, memory module 706, and bus 702. Bus 702 may be any suitable communication mechanism for communicating information. Processor module 704, storage module 710, I/O module 708, and memory module 706 are coupled with bus 702 for communicating information between any of the modules of controller 700 and/or information between any module of controller 700 and a device external to controller 700. For example, information communicated between any of the modules of controller 700 may include instructions and/or data. In some aspects, bus 702 may be a universal serial bus. In some aspects, bus 702 may provide Ethernet connectivity.

In some aspects, processor module 704 may comprise one or more processors, where each processor may perform different functions or execute different instructions and/or processes. For example, one or more processors may execute instructions for operating system 100, one or more processors may execute instructions for compressing a depthmap (e.g., methods 200 and 500), and one or more processors may execute instructions for input/output functions.

Memory module 706 may be random access memory ("RAM") or other dynamic storage devices for storing information and instructions to be executed by processor module 704. Memory module 706 may also be used for storing temporary variables or other intermediate information during execution of instructions by processor 704. In some aspects, memory module 706 may comprise battery-powered static RAM, which stores information without requiring power to maintain the stored information. Storage module 710 may be a magnetic disk or optical disk and may also store information and instructions. In some aspects, storage module 710 may comprise hard disk storage or electronic memory storage (e.g., flash memory). In some aspects, memory module 706 and storage module 710 are both a machine-readable medium.

Controller 700 is coupled via I/O module 708 to a user interface for providing information to and receiving information from an operator of system 100. For example, the user interface may be a cathode ray tube ("CRT") or LCD monitor for displaying information to an operator. The user interface may also include, for example, a keyboard or a mouse coupled to controller 700 via I/O module 708 for communicating information and command selections to processor module 704.

According to various aspects of the subject disclosure, methods described herein are executed by controller 700. Specifically, processor module 704 executes one or more sequences of instructions contained in memory module 706 and/or storage module 710. In one example, instructions may be read into memory module 706 from another machine-readable medium, such as storage module 710. In another example, instructions may be read directly into memory module 706 from I/O module 708, for example from an operator of system 100 via the user interface. Execution of the sequences of instructions contained in memory module 706 and/or storage module 710 causes processor module 704 to perform methods to compress a depthmap. For example, a computational algorithm for compressing a depthmap may be stored in memory module 706 and/or storage module 710 as one or more sequences of instructions. Information such as the minimum value, the maximum value, the depth values, the scalar values, the metadata, the primitive, the identification value, the one or more parameters defining the primitive, and other suitable information may be communicated from processor module 704 to memory module 706 and/or storage module 710 via bus 702 for storage. In some aspects, the information may be communicated from processor module 704, memory module 706, and/or storage module 710 to I/O module 708 via bus 702. The information may then be communicated from I/O module 708 to an operator of system 100 via the user interface.

One or more processors in a multi-processing arrangement may also be employed to execute the sequences of instructions contained in memory module 706 and/or storage module 710. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 704 for execution. Such a medium may take many forms, including, but not limited to, non-volatile media, and volatile media. Non-volatile media include, for example, optical or magnetic disks, such as storage module 710. Volatile media include dynamic memory, such as memory module 706. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for compressing a depthmap, the system comprising:
    an encoding module configured to determine a minimum value and a maximum value of a depthmap, the encoding module further configured to normalize the depthmap based on the minimum value, the maximum value, and an encoding model, the normalized depthmap comprising a scalar value for each pixel of the depthmap; and
    a compression module configured to compress the normalized depthmap.

2. The system of claim 1, further comprising a transmission module configured to combine metadata with the compressed normalized depthmap into a transmission file, the metadata comprising at least one of the minimum value, the maximum value, and a type of the encoding model.

3. The system of claim 2, wherein the transmission file is a JavaScript Object Notation (JSON) file.

4. The system of claim 1, wherein the scalar value for each pixel of the depthmap is greater than or equal to zero, and wherein the scalar value for each pixel of the depthmap is less than or equal to 1.

5. The system of claim 1, wherein the encoding model comprises at least one of a linear model and a nonlinear model.

6. The system of claim 5, wherein under the linear model, the scalar value for each pixel of the depthmap is given by $$\frac{d - \min}{\max - \min},$$

where d is a depth value of a corresponding pixel of the depthmap,
min is the minimum value, and
max is the maximum value.

7. The system of claim 5, wherein under the nonlinear model, the scalar value for each pixel of the depthmap is given by $$\frac{\max}{\max - \min} - \left(\frac{\max \min}{\max - \min}\right)\frac{1}{d},$$

where d is a depth value of a corresponding pixel of the depthmap,
min is the minimum value, and
max is the maximum value.

8. The system of claim 5, wherein the encoding module is configured to normalize the depthmap based on the linear model if the depthmap is generated from an orthographic image, the orthographic image providing an orthographic view in which orthographic rays are parallel to one another.

9. The system of claim 5, wherein the encoding module is configured to normalize the depthmap based on the nonlinear model if the depthmap is generated from a perspective image, the perspective image providing a perspective view in which perspective rays converge at a single source.

10. The system of claim 1, wherein the compression module is configured to compress the normalized depthmap using at least one of Joint Photographic Experts Group (JPEG) compression and portable network graphics (PNG) compression.

11. The system of claim 10, wherein the compression module is configured to compress the normalized depthmap using the JPEG compression, and wherein the compression module is configured to multiply the scalar value for each pixel of the depthmap by 255 to generate a compression value.

12. The system of claim 11, wherein the compression module is configured to round the compression value for each pixel of the depthmap to a nearest integer.

13. The system of claim 1, wherein a size of the compressed normalized depthmap is less than 1/10th of a size of the original depthmap.

14. A computer-implemented method for compressing a depthmap, the method comprising:
  determining a minimum value and a maximum value of a depthmap;
  normalizing the depthmap based on the minimum value, the maximum value, and an encoding model, the normalized depthmap comprising a scalar value for each pixel of the depthmap; and
  compressing, by a processor, the normalized depthmap.

15. The method of claim 14, further comprising combining metadata with the compressed normalized depthmap into a transmission file, the metadata comprising at least one of the minimum value, the maximum value, and a type of the encoding model.

16. The method of claim 14, wherein the scalar value for each pixel of the depthmap is greater than or equal to zero, and wherein the scalar value for each pixel of the depthmap is less than or equal to 1.

17. The method of claim 14, wherein the encoding model comprises at least one of a linear model and a nonlinear model.

18. The method of claim 17, wherein under the linear model, the scalar value for each pixel of the depthmap is given by $$\frac{d - \min}{\max - \min},$$

where d is a depth value of a corresponding pixel of the depthmap,
min is the minimum value, and
max is the maximum value.

19. The method of claim 17, wherein under the nonlinear model, the scalar value for each pixel of the depthmap is given by $$\frac{\max}{\max - \min} - \left(\frac{\max \min}{\max - \min}\right)\frac{1}{d},$$

where d is a depth value of a corresponding pixel of the depthmap,
min is the minimum value, and
max is the maximum value.

20. A system for compressing a depthmap, the system comprising:
  an encoding module configured to determine a minimum value and a maximum value of a depthmap, the encoding module further configured to normalize the depthmap based on the minimum value, the maximum value, and an encoding model, the normalized depthmap comprising a scalar value for each pixel of the depthmap, the encoding model comprising at least one of a linear model and a nonlinear model;
  a compression module configured to compress the normalized depthmap using Joint Photographic Experts Group (JPEG) compression; and
  a transmission module configured to combine metadata with the compressed normalized depthmap into a transmission file, the metadata comprising at least one of the minimum value, the maximum value, and a type of the encoding model.

21. A computer-implemented method for decoding a compressed depthmap, the method comprising:
  receiving a compressed version of a depthmap;
  decompressing, by a processor, the compressed version of the depthmap to generate a decompressed version of the depthmap, wherein the decompressed version of the depthmap is normalized based on a minimum value of an original version of the depthmap, a maximum value of the original version of the depthmap, and an encoding model, the normalized depthmap comprising a scalar value for each pixel of the original version of the depthmap; and
  decoding the normalized depthmap to generate the original version of the depthmap.

22. The method of claim 21, further comprising receiving a transmission file, the transmission file comprising metadata and the compressed version of the depthmap, the metadata comprising at least one of the minimum value, the maximum value, a type of the encoding model, and a type of compression scheme associated with the compressed version of the depthmap.

23. The method of claim 22, wherein the normalized depthmap is decoded based on the metadata.

24. The method of claim 22, further comprising accessing the original version of the depthmap using the metadata.

25. The method of claim 21, wherein the compressed version of the depthmap is decompressed using at least one of Joint Photographic Experts Group (JPEG) decompression and portable network graphics (PNG) decompression.

26. The method of claim 21, wherein the encoding model comprises at least one of a linear model and a nonlinear model.

27. The method of claim 26, wherein under the linear model, the scalar value for each pixel of the depthmap is given by $$\frac{d - \min}{\max - \min},$$

where d is a depth value of a corresponding pixel of the depthmap,
min is the minimum value, and
max is the maximum value.

28. The method of claim 26, wherein under the nonlinear model, the scalar value for each pixel of the depthmap is given by $$\frac{\max}{\max - \min} - \left(\frac{\max \min}{\max - \min}\right)\frac{1}{d},$$

where d is a depth value of a corresponding pixel of the depthmap,
min is the minimum value, and
max is the maximum value.

* * * * *